United States Patent [19]

Leistner et al.

[11] 4,146,517

[45] Mar. 27, 1979

[54] INORGANIC AND ORGANIC ACID COESTER STABILIZERS

[75] Inventors: William E. Leistner, Atlantic Beach, N.Y.; Motonobu Minagawa, Kosigaya, Japan; Yutaka Nakahara, Iwatsuki, Japan; Tohru Haruna, Okegawa, Japan

[73] Assignee: Argus Chemical Corporation, Brooklyn, N.Y.

[21] Appl. No.: 772,994

[22] Filed: Feb. 28, 1977

[30] Foreign Application Priority Data

Feb. 27, 1976 [JP] Japan ................................ 51-20930

[51] Int. Cl.$^2$ ..................... C01C 69/96; G08G 63/62; C08K 51/55

[52] U.S. Cl. ................................. 260/23 H; 260/823; 260/23 XA; 260/45.85 S; 260/45.95 D; 260/45.95 C; 260/45.85 B; 260/462 R; 252/404; 528/98; 528/104; 528/196

[58] Field of Search ...... 260/462 R, 47 XA, 45.95 D, 260/45.95 C, 45.95 B, 23 XA, 23 H, 45.85 S; 252/404

[56] References Cited

U.S. PATENT DOCUMENTS

| | | | |
|---|---|---|---|
| 2,999,841 | 9/1961 | Csendes | 260/45.95 E |
| 3,026,264 | 3/1962 | Rocklin et al. | 260/45.95 B |
| 3,239,484 | 3/1966 | Stark | 260/45.95 B |
| 3,244,650 | 4/1966 | Hecker | 260/23 H |
| 3,361,672 | 1/1968 | Andress et al. | 260/462 R |
| 3,404,122 | 10/1968 | Fritz et al. | 260/47 XA |
| 3,433,225 | 7/1969 | Pollock | 260/23 XA |
| 3,544,514 | 12/1970 | Schnell et al. | 260/47 XA |
| 3,646,098 | 2/1972 | Cyba | 260/462 R |
| 3,737,486 | 6/1973 | Schutze et al. | 260/45.95 D |

OTHER PUBLICATIONS

Polymer Engineering and Science—Jul., 1966, pp. 231 to 239, Article by Gordon et al.

*Primary Examiner*—V. P. Hoke
*Attorney, Agent, or Firm*—Otto S. Kauder

[57] ABSTRACT

New polyhydric phenol coesters are disclosed of polyhydric phenols, having 2 to 3 phenolic hydroxyl groups and 1 to 3 benzenoid rings, with carbonic acid and an inorganic acid which can be phosphorous acid, phosphoric acid, and boric acid. The new coesters have molecular weights from 700 to about 10,000, preferably from 1200 to 7000, and are highly effective stabilizers for a variety of synthetic resins.

Stabilizer compositions comprising a polyhydric phenol coester and a known polymer stabilizer, as well as synthetic resins stabilized with such stabilizer compositions, are also disclosed.

14 Claims, No Drawings

INORGANIC AND ORGANIC ACID COESTER STABILIZERS

BACKGROUND OF THE INVENTION

This invention relates to a new class of polyhydric phenol coesters and to synthetic resin stabilizer compositions comprising these coesters as well as to synthetic resins stabilized with such coesters and with stabilizer compositions comprising these coesters along with known polymer stabilizers.

The usefulness of phenols in stabilizer compositions for synthetic resins was recognized early in the development of polymer stabilization by additives, as disclosed for example by F. Duggan in U.S. Pat. No. 2,126,179 of Aug. 9, 1938, W. Leistner in U.S. Pat. No. 2,564,646 of Aug. 14, 1951, and W. Fischer in U.S. Pat. No. 2,625,521 of Jan. 13, 1953, in the stabilization of polyvinyl chloride resin compositions. Over the years, phenolic stabilizers have been used in an expanding variety of synthetic resins and an enormous number of disclosures of new phenolic stabilizers has accumulated. Rather than attempt to list every one of these disclosures, A. DiBattista in U.S. Pat. No. 3,824,192 of July 16, 1974 and M. Minagawa in U.S. Pat. No. 3,849,370 of Nov. 19, 1974 and in U.S. Pat. No. 3,869,423 of Mar. 4, 1975 are cited as summaries of a very large part of the existing art of phenolic stabilizers.

Phenolic stabilizers are also employed in conjunction with other stabilizers such as esters of thiodipropionic acid or organic phosphites in the stabilization of polypropylene and other synthetic resins against degradation upon heating or ageing under atmospheric conditions. Disclosures by C. Tholstrup, U.S. Pat. Nos. 3,033,814 of May 8, 1962 and 3,160,680 of Dec. 8, 1964; L. Rayner, U.S. Pat. No. 3,181,971 of May 4, 1965; D. Bown, U.S. Pat. No. 3,242,135 of Mar. 22, 1966; S. Murdock, U.S. Pat. No. 3,245,949 of Apr. 12, 1966; H. Hagemeyer, U.S. Pat. No. 3,282,890 of Nov. 1, 1966; J. Casey, U.S. Pat. Nos. 3,496,128 of Feb. 17, 1970 and 3,586,657 of June 22, 1971; M. Minagawa, U.S. Pat. Nos. 3,549,572 of Dec. 22, 1970, and 3,629,189 of Dec. 21, 1971, and 3,673,153 of June 27, 1972, 3,849,370 of Nov. 19, 1974 and 3,869,423 of Mar. 4, 1975; W. Drake U.S. Pat. No. 3,624,026 of Nov. 30, 1971; A. DiBattista, U.S. Pat. No. 3,824,192 of July 16, 1974; B. Cook, U.S. Pat. No. 3,850,877 and H. Mueller U.S. Pat. No. 3,850,918 of Nov. 26, 1974; M. Dexter U.S. Pat. No. 3,856,748 of Dec. 24, 1974, and 3,888,824 of June 10, 1975, and 3,903,160 of Sept. 2, 1975; P. Klemchuk of U.S. Pat. No. 3,860,558 of Jan. 14, 1975; M. Rasberger U.S. Pat. Nos. 3,867,340 of Feb. 18, 1975 and 3,901,931 of Aug. 26, 1975; H. Brunetti U.S. Pat. Nos. 3,867,337 of Feb. 18, 1975 and 3,873,498 of Mar. 25, 1975; S. Rosenberger U.S. Pat. Nos. 3,884,874 of May 20, 1975 and 3,887,518 of June 3, 1975; C. Ramey U.S. Pat. No. 3,907,803 of Sept. 23, 1975 are representative of a very large number of stabilizer combinations including dilauryl and distearyl thiodipropioniate or other dialkyl thiodipropionates along with polyhydric phenols and sometimes organic phosphites, metallic stearates, ultraviolet absorbers, nickel compounds, and heavy metal deactivators for use in polypropylene and other polyolefins.

Disclosures by R. Werkheiser, U.S. Pat. No. 2,726,226 of Dec. 6, 1975; I. Salyer et al, U.S. Pat. No. 2,985,617 of May 23, 1961; L. Friedman, U.S. Pat. No. 3,039,993 of June 19, 1962; W. Nudenberg, U.S. Pat. No. 3,080,338 of Mar. 5, 1963; C. Fuchsman, U.S. Pat. No. 3,082,187 of Mar. 19, 1963; H. Orloff et al, U.S. Pat. No. 3,115,465 of Dec. 24, 1963; A. Nicholson, U.S. Pat. No. 3,167,526 of Jan. 26, 1965; A. Hecker et al, U.S. Pat. Nos. 3,149,093 of Sept. 15, 1964, 3,244,650 of Apr. 5, 1966 and 3,225,136 and 3,255,151 of June 7, 1966; C. Bawn, U.S. Pat. No. 3,352,820 of Nov. 14, 1967; D. Miller, U.S. Pat. No. 3,535,277 of Oct. 20, 1970; J. Casey, U.S. Pat. No. 3,586,657 of June 22, 1971; C. Abramoff U.S. Pat. No. 3,856,728 of Dec. 24, 1974; M. Minigawa, U.S. Pat. Nos. 3,869,423 of Mar. 4, 1975 and 3,907,517 of Sept. 23, 1975; and British Pat. Nos. 846,684, 851,670, and 866,883 are representative of stabilizer combinations including organic phosphites, polyhydric phenols, and other active ingredients.

As summarized in a publication by D. Plank and J. Floyd (title-"Polycarbonates: A New Concept in Stabilization for Polypropylene," meeting preprints, Society of Plastics Engineers, Houston, Texas, April 1975; pages 33–37), there have long been several problems with using phenols as stabilizers despite their widespread use. Many phenol stabilizers are volatilized out of the polymer at high use temperatures. Some phenol stabilizers are extractable under certain use conditions. The oxidative products of most phenols are highly colored, thus imparting a yellow color to the polymer. Many phenols are reactive towards acidic or basic residues in the polymer. Following are disclosures of suggested ways to overcome these problems.

L. Friedman has disclosed in U.S. Pat. No. 3,053,878 of Sept. 11, 1962 a class of linear phosphite polymers having the formula

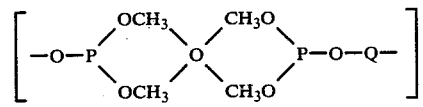

in which Q is the alkylene or arylene portion of a dihydric alcohol or dihydric phenol. R. Morris et al. in U.S. Pat. No. 3,112,286 of Nov. 26, 1963 disclosed phosphites having the formula

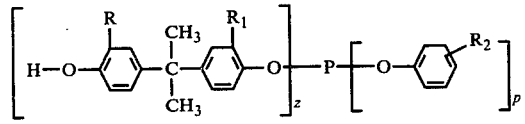

in which R represents a bulky hydrocarbon group such as t-butyl, t-amyl, t-hexyl, cyclohexyl, t-pentyl, t-octyl, phenyl, and the like: $R_1$ represents hydrogen and R; $R_3$ represents an alkyl group from 6 to 20 carbon atoms which is preferably in the meta or para position; x represents a number of from 1 to 3 inclusive; y represents a number of from 0 to 2 inclusive and the sum of the numerical value of $x+y$ is always exactly 3.

D. Bown, U.S. Pat. No. 3,297,631 of Jan. 10, 1967 disclosed condensation products of phosphorus compounds with bisphenols and trisphenols which may be represented by the structures:

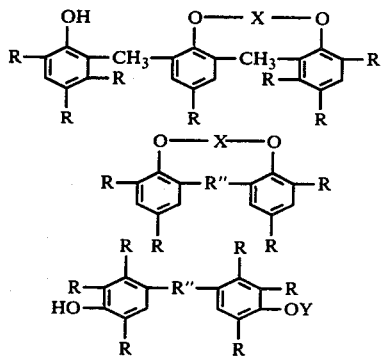

where:
X is selected from the following: $>P-OR'$; $>P-R'$;

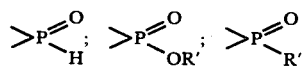

and Y is selected from the following: $-P(OR')_2$;

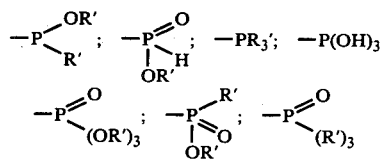

R is hydrogen, alkyl of 1 to 16 carbon atoms or aryl or a combination of these; R' is alkyl of 1 to 16 carbon atoms or aryl, and R" is alkylidene of 1 to 16 carbon atoms or an aryl-substituted alkylidene.

C. Baranauckas, U.S. Pat. No. 3,305,608 of Feb. 21, 1967, disclosed phenolic phosphites useful as polymer stabilizers prepared by reacting a triorganophosphite, a polyol, and an aromatic material having two to six phenolic hydroxyl groups at 60°–180° C. in specified proportions.

G. Brindell, U.S. Pat. No. 3,412,064 of Nov. 19, 1968 disclosed phenolic phosphites represented by the general formula:

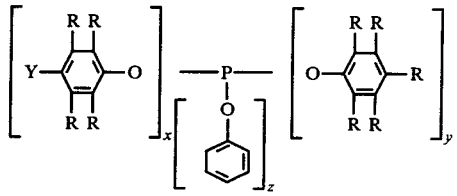

where x is from 1 to 3, y and z each from 0 to 2, $x+y+z=3$, R is hydrogen or alkyl and Y is hydroxyl or a group of the formula

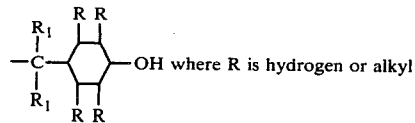

M. Larrison, U.S. Pat. No. 3,419,524 of Dec. 31, 1968, disclosed phosphites useful as polymer stabilizers having the formula:

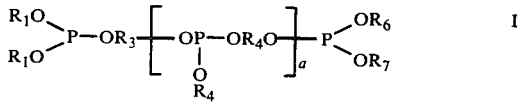

where $R_1$, $R_2$, $R_4$, $R_6$, and $R_7$ are aryl or haloaryl, and $R_3$ and $R_5$ are a polyalkylidene glycol or an alkylidene bisphenol or a hydrogenated alkylidene bisphenol or a ring halogenated alkylidene bisphenol from which the two terminal hydrogens have been removed.

O. Kauder et al, U.S. Pat. Nos. 3,476,699 of Nov. 4, 1969 and 3,655,832 of Apr. 11, 1972 disclosed organic phosphites containing a free phenolic hydroxyl group and defined by the formula:

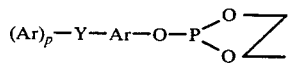

wherein Z is selected from the group consisting of hydrogen and aliphatic, cycloaliphatic, aromatic, heterocyclic and $(Ar)_p$-Y-Ar groups, taken in sufficient number to satisfy the valences of the two phosphite oxygen atoms; Y is a polyvalent linking group selected from the group consisting of oxygen; aliphatic, cycloaliphatic and aromatic hydrocarbon groups attached to each Ar group through a carbon atom not a member of an aromatic ring; oxyaliphatic; thioaliphatic, oxycycloaliphatic, thiocycloaliphatic; heterocyclic; oxyheterocyclic, thioheterocyclic, carbonyl, sulfinyl; and sulfonyl groups; Ar is a phenolic nucleus which can be phenyl or a polycarbocyclic group having condensed or separate phenyl rings; each Ar group is either connected through an oxygen atom to a phosphite group or contains a free phenolic hydroxyl group, or both; and p is a number, one or greater, and preferably from one to four, which defines the number of Ar groups linked to Y.

L. Friedman, U.S. Pat. No. 3,516,963 of June 23, 1970, disclosed phosphites having the formula:

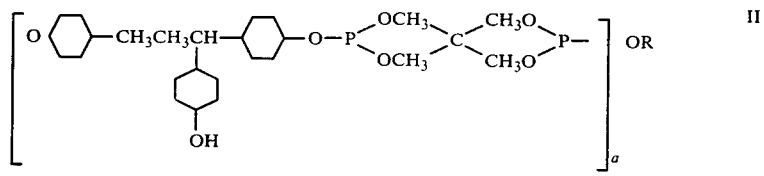

where R is alkyl, alkenyl, aryl, aralkyl, haloaryl, haloalkyl or

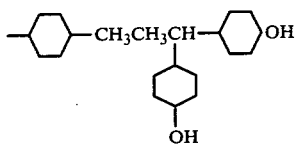

and n is an integer of at least 1. n can be 2, 3, 4, 5, 6, 7, 8, 10, 50, 100 or even more.

D. Bown et al. in U.S. Pat. Nos. 3,510,507 of May 5, 1970 and 3,691,132 of Sept. 12, 1972 disclosed polyolefins stabilized with polyphosphites, polyphosphates, polyphosphonites, polyphosphonates, polyborates, polycarbonates, and polysilanes which are condensation products of a 4,4′-bisphenol with a condensing or linking agent which may be of the ester type, such as the esters of triaryl or mixed aryl-alkyl compounds, or the acid halide type. Bown's condensation product stabilizers have molecular weights between 600 and 8000 or higher and are described by the structural formula,

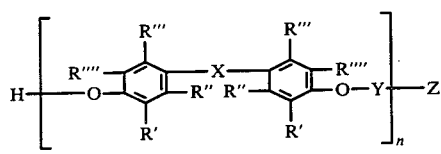

where X is selected from the group consisting of

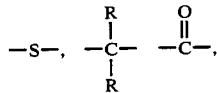

—C—C, and C—A—C— where

A is a $C_1$ to $C_{16}$ alkylene or an arylene; R′, R″, R‴, and R″″ are selected from the group consisting of hydrogen, $C_1$ to $C_{18}$ alkyls, and an aryl group; Y is selected from the group of

where R is hydrogen, a $C_1$ to $C_{18}$ alkyl, or aryl;

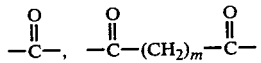

where m is 0 to 10, preferably 4 to 8,

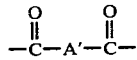

where A′ is $(CH_2)_n$—S—$(CH_2)_n$ or —$(CH_2$-$)_n$—S—$(CH_2)_m$—S—$(CH_2)_n$ where n is 0 to 10, preferably 2 and m is 0 to 10, preferably 5;

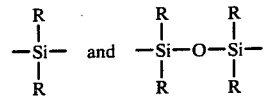

where R is an alkyl, preferably methyl, and Z is

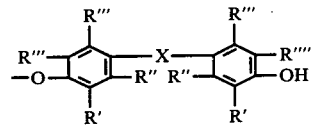

where R′, R″, R‴, R″″, and X correspond respectively to the R′,R″,R‴,R″″, and X previously selected when n has a value from 1 to 15, or Z may be derived from the compound used to introduce Y into the product when n has a value from 2 to 15, for example —R or —OR where R is hydrogen, an alkyl, or aryl. When Y in the formula of Bown's stabilizer is

the stabilizer is a type of hydroxyaryl phosphite. Similarly, when Y in the formula is

the stabilizer is a hydroxyaryl carbonate.

Bown's condensation products are described as especially effective in high molecular weight solid polyolefins when used together with a dialkyl sulfide costabilizer such as dilauryl thiodipropionate, distearyl thiodipropionate, ditridecyl thiodipropionate, dicetyl sulfide, bis(tetradecylmercapto) paraxylylene, and 10,24-dithiotetracontane.

J. Floyd et al in German published application 2505071 of Aug. 14, 1975 abstracted in Chemical Abstracts 1976, Volume 84, abstract no. 5945f, disclosed low molecular weight polycarbonate esters of bisphenols such as 2,2-bis(3-t-butyl-4-hydroxyphenylpropane) and 4,4′-butylidene bis(6-t-butyl-3-methylphenol) prepared in such a way as to contain few or no free phenolic hydroxyl groups as being highly effective heat and light stabilizers for polyolefins and giving a synergistic effect with distearyl thiodipropionate, tris (nonylphenyl) phosphite, and distearyl pentaerythritoldiphosphite.

D. Plank and J. Floyd in the 1975 publication already cited have disclosed two general synthetic procedures for preparing stabilizer polycarbonates. They may be obtained by direct phosgenation of a bisphenol either in methylene chloride with pyridine as a catalyst or directly in pyridine. Using this procedure, a typical product obtained has the following formula.

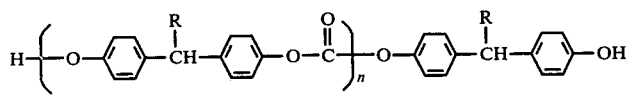

The authors did not state the nature of R or a value of n but did indicate that the molecular weight can be controlled easily by adding a modifier to the reaction mixture. The nature of the modifier is not mentioned. The authors disclosed a range of molecular weights from 680 to 1952, with the highest molecular weight products providing the longest 150° C. oven life in polypropylene also containing a thioester, distearyl thiodipropionate. The authors stated that when used alone, two products within their class of polycarbonates are not effective stabilizers, but they formed a very effective stabilizing system in combination with a thioester.

In other disclosures of polyhydric phenol carbonate ester additives to synthetic resin compositions, H. Peters in German patent 1,146,251 of Mar. 28, 1963 improved mechanical properties of polyolefins by adding 0.5 to 50% 2,2bis(4-hydroxyphenylpropane) carbonic acid polyester. T. Saito in U.S. Pat. No. 3,364,281 of Jan. 16, 1968 disclosed polyolefin fibers of improved dyeability containing 1 to 20% of polymeric additive which can be a high molecular weight polyhydric phenol carbonate. Solvay et Cie. in British Pat. No. 1,135,976 of Dec. 11, 1968 has disclosed the use of a high molecular weight bis(hydroxyphenyl) propane-phosgene condensation product as an adjunct to the polymerization initiator for the polymerization of ethylene. I. Ouchi in Japanese Pat. No. 69-21,676 of Sept. 16, 1969 improved the smoothness of polyethylene terephthalate film by incorporating a small percentage of polycarbonate. Z. Opritz in USSR Pat. No. 314,827 Sept. 21, 1971 disclosed improved heat resistance of polyamides prepared from amino acids or lactams by addition of up to 10% of a polycarbonate having a formula $(OC_6H_4RC_6H_4O_2C)_x$ where R is $CH_2$, $CMe_2$, or $C(C_nH_{2n+1})_2$. Y. Umezawa in Japanese Kokai 72-34,744 of Nov. 22, 1972 disclosed styreneacrylonitrile copolymer compositions having improved moldability and mechanical properties with 5 to 40% polycarbonate resin. None of these disclosures relates to a coester of a polyhydric phenol with carbonic acid and a dicarboxylic acid or to a carbonate ester of molecular weight less than 10,000.

Carbonate esters and carbonate-dicarboxylic acid coesters of polyhydric phenols are known in the form of high molecular weight materials that are useful as films, fibers, molded or extruded parts and surface coatings for use in structural, decorative and electrical applications. The extensive literature has been reviewed by L. Bottenbruch in "Encyclopedia of Polymer Science and Technology" (N. Bikales, ed.) Volume 10, pages 714–725 (J. Wiley — Interscience Publishers, New York 1969). High molecular weight coesters including aliphatic dicarboxylic acids in the polymer chain with polyhydric phenol carbonates have been disclosed by E. Goldberg, in U.S. Pat. Nos. 3,020,331 and 3,030,335 of Apr. 17, 1962, 3,161,615 of Dec. 15, 1964, 3,169,121 of Feb. 9, 1965, and 3,207,814 of Sept. 21, 1965, N. Reinking in U.S. Pat. No. 3,166,606 of Jan. 19, 1965 and H. Schnell in U.S. Pat. No. 3,553,167 of Jan. 5, 1971.

SUMMARY OF THE INVENTION

In accordance with this invention, new polyhydric phenol coesters of polyhydric phenols having 2 to 3 phenolic hydroxyl groups and 1 to 3 benzenoid rings with carbonic acid and an inorganic acid selected from the group consisting of phosphorous acid, phosphoric acid, and boric acid are prepared. The coesters have molecular weights ranging from 700 to about 10,000, preferably from 1200 to about 7000 for highest effectiveness as ingredients of stabilizer compositions for synthetic resins. The molar proportions of the inorganic acid to the carbonic acid in the coester range from 19:1 to 1:19, preferably from 4:1 to 1:4. The coesters of the invention can contain a single polyhydric phenol or a plurality of polyhydric phenols as well as a single inorganic acid or a plurality of inorganic acids.

Synthetic resin stabilizer compositions comprising the coesters of this invention contain at least one known polymer stabilizer along with one or more coesters according to this invention. The proportions of coester to known polymer stabilizer in such stabilizer compositions can range from 1 to 1 to about 1 to 30 by weight.

DESCRIPTION OF THE PREFERRED EMBODIMENTS

Essential to the achievement of the unexpected effectiveness in resin stabilizer compositions of the coesters of this invention are the combined inorganic-organic structure and controlled molecular weight of the polyhydric phenol inorganic acid and carbonic acid coesters. There results from these essential features a minimal volatility and leachability so that the stabilizing effectiveness manifested by the coesters is maintained over long periods of time where resin compositions stabilized with the coesters are exposed to the action of air, water, and chemical solutions at an elevated temperature.

The polyhydric phenol inorganic acid-carbonate coesters of this invention are derived from carbonic acid, introduced into the molecule by a carbonylating agent such as an ester or acid chloride of carbonic acid; at least one inorganic acid introduced into the molecule by way of an ester or acid chloride of the inorganic acid; and a polyhydric phenol having two to three hydroxyl groups and one to three benzenoid rings which can be substituted with up to three alkyl, cycloalkyl, or aralkyl groups having 1 to 10 carbon atoms. For reasons that are not well understood the greatest stabilizing effectiveness is associated with inorganic acid — carbonic acid coesters of polyhydric phenols having an odd number of benzenoid rings in the polyhydric phenol.

The polyhydric phenol carbonate-inorganic acid coesters of this invention are crystalline powders or grindable glassy solids.

A preferred class of polyhydric phenol carbonate-inorganic acid coesters of this invention is derived from ortho-substituted 1,3- and 1,4-dihydric phenols having one benzenoid ring such as 2,5- di-t-butyl-hydroquinone, 2,3,6-trimethylhydroquinone, 2-methylresorcinol, and 2,6-di-t-butylresorcinol.

Also useful polyhydric phenol carbonate-inorganic acid coesters are coesters of ortho-substituted bisphenols having two ortho-substituted phenolic groups linked directly or through a two valent hydrocarbon group such as 2,2'-methylene bis(4-methyl-6-t-butylphenol), 2,2'-methylene bis(4-ethyl-6-t-butyl-phenol), 2,2'-methylene bis(4-methyl-6-(1-methylcyclohexyl)-phenol), 2,2'-n-butylidene bis(4,6-dimethylphenol), bis-1,1-(2'-hydroxy-3'5'-di-methylphenyl)-3,5,5-trimethyl-hexane, 2,2'-cyclohexylidene bis (4-ethyl-6-t-butylphenol), 4,4'-bis(2,6-di-t-butylphenol), 4,4'-methylene bis(2,6-di-t-butylphenol), 4,4'-isopropylidene bis (2-phenylethylphenol), 4,4'-n-butylidene bis(3-methyl-6-t-butylphenol), 4,4'-cyclohexylidene bis (2-t-butylphenol), 4,4'-cyclohexylidene bis(2-cyclohexylphenol), and 4,4'-benzylidene bis (2-t-butyl-5-methylphenol).

Another preferred class of polyhydric phenol carbonate-inorganic acid coesters provided in accordance with this invention is the class of carbonate coesters of ortho-substituted phenols having two-ortho-substituted phenolic groups linked through oxygen or sulfur, such as 4,4'-oxobis(3-methyl-6-isopropylphenol), 4,4'-thiobis(2-methyl-6-t-butyl phenol), 4,4'-thiobis(3-methyl-6-t-butylphenol), 4,4'-sulfobis (3-methyl-6-t-butylphenol), bis (2-methyl-4-hydroxy-5-t-butylbenzyl)sulfide, bis(3,5-di-t-butyl-4-hydroxy benzyl)sulfide, 2,2'-thiobis(4-hydroxy benzyl)sulfide, 2,2'-thiobis(4-t-butyl-6-methylphenol), 2,2'-thiobis(4-methyl-6-t-butyl-phenol), and 2,2'-thiobis(4,6-di-t-butylphenol).

A particularly preferred class of polyhydric phenol carbonate-inorganic acid coesters is the class of carbonate coesters of ortho-substituted trisphenols having three ortho-substituted phenolic groups, such as 1,1,3-tris(2'methyl-4'-hydroxy-5'-t-butylphenyl)butane, 1,3,5-tris(3',5'-di-t-butyl-4'-hydroxybenzyl)-2,4,6-trimethylbenzene, 2,2-bis(3'-t-butyl-4'-hydroxyphenyl)-4-(3",5"-di-t-butyl-4"-hydroxyphenyl)butane, and 2,2-bis(2'-methyl-5-t-butyl-4'-hydroxyphenyl)-4-(3",5"-di-t-butyl-4"'-hydroxyphenyl) butane.

The polyhydric phenol inorganic acid carbonate coesters of this invention can be prepared by the reaction of a carbonylating agent such as phosgene, a chloroformate ester, a dialkyl carbonate or a diaryl carbonate with an inorganic acid compound and a substituted dihydric or trihydric phenol in one or several reaction stages. Acid acceptors such as ammonia, pyridine, organic amines, and inorganic alkalies can be used with phosgene and chloroformate esters, and acidic or alkaline transesterification catalysts can facilitate the reaction of alkyl and aryl carbonate esters. The molecular weight of the coester is regulated by the proportions of inorganic acid compound and carbonylating agent to dihydric or trihydric phenol. The more closely the proportions of the combined inorganic acid and carbonylating agent to dihydric or trihydric phenol approach one to one compound equivalent of each reactant the higher the molecular weight of the resulting product.

Conversely, either reactant can be used in large excess to prepare products having nearly the lowest molecular weight possible, that is a coester having a single carbonate ester group, a single inorganic acid ester group, and the minimum number of polyhydric phenol groups to link these together. Thus the product of the reaction between two moles of a dihydric phenol and one mole of carbonylating agent is a relatively low molecular weight mixture of carbonate esters in which the bis(hydroxyaryl carbonate) of the dihydric phenol predominates, and the product of the reaction between two moles of a carbonate ester carbonylating agent (e.g. diphenyl carbonate) and one mole of dihydric phenol is a relatively low molecular weight mixture of carbonate esters in which the dihydric phenol bis(phenyl carbonate) ester predominates.

Each of these products can then be used to prepare a coester of this invention by reaction with an appropriate inorganic acid compound. Thus the above bis(hydroxyaryl) carbonate ester of the polyhydric phenol can be caused to condense with the acid chloride or phenyl ester of an inorganic acid, with elimination of hydrogen chloride or phenol as side product respectively, to give a carbonate-inorganic acid coester with a molecular weight depending on the relative proportions of reactants. Similarly, a polyhydric phenol phenyl carbonate ester can be transesterified with a hydroxyaryl ester of an inorganic acid to displace phenol and give a carbonate-inorganic acid coester of the polyhydric phenol present in each of the starting materials, which means that the coester can be made up of different polyhydric phenols if each of the starting materials contains a different polyhydric phenol. Both techniques just described are essentially two stage reaction techniques that yield coesters of a relatively ordered structure in which polyhydric phenol groups are alternatingly linked through carbonate ester groups and through inorganic acid ester groups. Coesters prepared at elevated temperature, such as by the phenol ester transesterification technique, have the ordered alternating structure modified to a minor extent as a result of ester-ester interchange randomization. The reactions can be illustrated by equations in which for convenience the symbols HO-Ar-OH and HO-Ar'-OH are used for the polyhydric phenols that can be used according to this invention, and $(PhO)_3Z$ and $ZCl_3$ represent any of the phenyl esters and acid chlorides of inorganic acids that can be used.

A. Condensation of hydroxyaryl carbonate with inorganic acid compound:

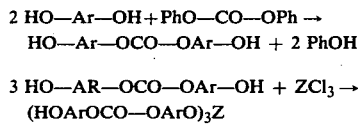

B. Condensation of phenyl carbonate of polyhydric phenol with an inorganic acid ester of a different polyhydric phenol:

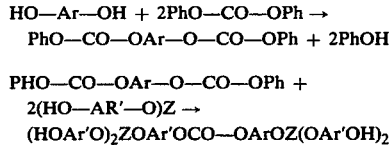

Coesters of this invention can also be prepared in a single reaction step leading to a random arrangement of carbonic acid ester and inorganic acid ester groups in the structure of the coester. Thus the polyhydric phenol (or mixture of more than one polyhydric phenols) can be heated with a mixture of diphenyl carbonate and inorganic acid phenyl ester with removal of the side-product phenol. Alternatively, the polyhydric phenol (or mixture of polyhydric phenols) can be reacted, suitably dissolved in an inert solvent such as toluene, methylene chloride or trichloroethylene, with a mixture of inorganic acid trichloride and carbonyl chloride $(COCl_2)$ or a polyhydric phenol chlorocarbonate ester $Ar(OCOCl)_{2-3}$ with elimination of by-product hydrogen chloride by reaction with an acid acceptor which can be an organic amine dissolved in the reaction solution, a suspension of an inorganic alkali, or an aqueous solution of an inorganic alkali.

Both the phenyl ester reaction and the acid chloride reaction can be facilitated by the use of catalysts. The phenyl ester reaction is suitably catalyzed by substances of sufficient alkalinity to convert phenol at least in part to the phenoxide ion, such as alkali and alkaline earth metals and their oxides, hydroxides, sulfides, cyanides, phenolates, hydrides, alcoholates, and carboxylates as well as aliphatic and cycloaliphatic amines, preferably tertiary amines to avoid the possible complication of amide formation. Suitable catalysts for the acid chloride reaction include tertiary amines, tertiary phosphines, and the hydrogen halide and alkyl halide addition salts thereof. Catalyst concentrations usefully range from 0.01% to about 5% by weight of reaction mixture. Preferred catalysts for the acid chloride reaction have the ability to partition between water and an immiscible hydrocarbon phase with a partition coefficient between 0.01 and 100.

Both the phenyl ester reaction method of preparing the coester of this invention and the acid chloride method can be carried out over a convenient range of reaction temperatures. The phenyl ester reaction is conveniently carried out at elevated temperatures of the order of 80° to 210° C. with removal of the side product phenol by distillation, suitably under diminished pressure. It is frequently helpful to begin the reaction by an atmospheric pressure cook, suitably with nitrogen or other inert gas protection over the reaction mass to preserve its light color, and apply vacuum gradually after a quantity of side product has accumulated for removal.

The acid chloride reaction is conveniently carried out at ambient temperatures or as cold as −15° C. Elevated temperatures in the 40° to 90° C. range can also be used.

In coesters prepared with an excess of equivalents of the dihydric or trihydric phenol reactant over the equivalents of carbonylating agent and inorganic acid compound combined, the coester is predominantly terminated by hydroxyaryl groups, while in coesters prepared with an excess of the combined equivalents of inorganic acid compound and carbonylating agent over the phenol, ester termination predominates. The hydroxyaryl terminated coesters having an average molecular weight ranging from 700 to about 10000 & especially with a molecular weight ranging from 1200 to about 7000 are preferred.

Synthetic resins that can be stabilized with compositions comprising a polyhydric phenol and inorganic acid-carbonate coester according to this invention include alphaolefin polymers such as polyethylene, polypropylene, polybutene, poly-3-methylbutene, or copolymers thereof such as ethylenevinylacetate copolymer, ethylenepropylene copolymer, polystyrene, polyvinylacetate, acrylic ester resins, copolymers from styrene and another monomer (for example, maleic anhydride, butadiene, acrylonitrile and so on), acrylonitrile-butadiene-styrene copolymer, acrylic acid ester-butadiene-styrene copolymer, methacrylic acid ester-butadiene-styrene copolymer, methacrylate ester resin such as polymethylmethacrylate, polyvinylalcohol, ethylene and butylene terephthalate polyesters, polyamide, polycarbonate, polyacetal, polyurethane, cellulosic resin, or phenolic resin, urea resin, melamine resin, epoxy resin, unsaturated polyester, silicone resin, halogen-containing resins such as polyvinyl chloride, polyvinylidene chloride, polyvinylidene fluoride and copolymers thereof, and further rubbers such as isoprene rubber, chloroprene rubber, and blends of the above resins.

Stabilizer compositions comprising a polyhydric phenol inorganic acid-carbonate coester according to this invention can be formulated and marketed in liquid, solid, and paste forms. An inert solvent can be used to facilitate handling. The polyhydric phenol coester and known polymer stabilizers can also be solubilized in one another by heating, such as at 70°–160° C. for up to 4 hours, and then allowing the resulting melt to cool and harden sufficiently to be flaked and ground.

Known polymer stabilizers can be used in synthetic resin compositions together with the coester stabilizers of this invention and can be admixed with the latter. Such stabilizers include thiodipropionic acid esters, polyvalent metal salts of carboxylic acids, organic phosphites, 1,2-epoxides, polyhydric alcohols, polyhydric alcohol 3-alkylthiopropionic acid esters, ultraviolet absorbers and heavy metal deactivators. Representative thiodipropionic acid esters include di-n-dodecyl thiodipropionate, dihexadecyl thiodipropionate, distearyl thiodipropionate, n-octyl eicosanyl thiodipropionate and n-octadecyl cyclohexane-1,4-dimethanol thiodipropionate polyester. A comprehensive disclosure of useful thiodipropionate esters by M. Minagawa et al in U.S. Pat. No. 3,869,423, column 17 line 55 to column 19 line 54 is here incorporated by reference. When thiodipropionate esters are used the concentration based on 100 parts of polymer can range from 0.05 to about 0.75 parts by weight.

Representative polyvalent metal salts include zinc, calcium, magnesium, barium, strontium and nickel salts of monocarboxylic acids having 6 to 24 carbon atoms, for example zinc benzoate, calcium palmitate, and nickel 2-ethylbutyrate. A comprehensive disclosure of useful metal salts by M. Minagawa et al in U.S. Pat. No. 3,869,423, column 19 line 56 column 20 line 35 is here incorporated by reference. When metal salts are used the concentration based on 100 parts by weight of polymer can range from 0.1 to about 3 parts by weight.

Representative organic phosphites include triisodecylphosphite, tris (nonylphenyl phosphite), and 4,4'-isopropylidene diphenol alkyl ($C_{12}$–$C_{15}$) phosphite. A comprehensive disclosure of useful organic phosphites by M. Minagawa in U.S. Pat. No. 3,849,370 column 13 line 63 to column 16 line 48 is here incorporated by reference. Typical use concentrations of organic phosphites are in the range from 0.02 part to about 2 parts by weight per 100 parts of polymer being stabilized.

Representative 1,2-epoxides that can be used in stabilizer compositions according to this invention include epoxysoybean oil, epoxylinseed oil, and 2-ethylhexyl epoxystearate. A comprehensive disclosure of 1,2-epoxides by M. Minagawa et al in U.S. Pat. No. 3,869,423 column 26 line 13 to line 39 is here incorporated by reference. Typical use concentrations of 1,2-epoxides range from 0.3 to about 6 parts by weight per 100 parts of synthetic resin composition.

Aliphatic polyhydroxy compounds can be included with stabilizer compositions of this invention in amounts corresponding to 0.1 to about 1 part per 100 parts of polymer being stabilized. Typical aliphatic polyhydroxy compounds are glycerol, polyglycerol, mono- di-, and tri-pentaerythritol, mannitol, sorbitol, and partial esters of these with saturated and unsaturated fatty acids having 6 to 22 carbon atoms.

3-Alkylthio propionates of polyhydric alcohols can be included in stabilizer compositions of this invention in amounts corresponding to 0.02 to about 1 part per 100 parts of synthetic resin being stabilized. The propionate esters have 4 to about 34 carbon atoms in the alkylthiopropionate group, 2 to bout 15 carbon atoms in the polyhydric alcohol group and 2 to about 8 ester groups in the molecule. Representative propionate esters are 2,2-dimethylpropanediol bis (3-n-dodecylthio-2-methylpropionate), pentaerythritol tetrakis(3-n-octylthiopropionate) and tris (3-n-octadecylthiopropionyloxyethyl)isocyanurate. For a further listing of useful 3-alkylthiopropionates the disclosure of A, Onishi U.S. Pat. No. 3,629,194 can be consulted.

Ultraviolet absorbers can be included in stabilizer compositions of this invention in amounts corresponding to 0.05 to about 1 part per 100 parts of synthetic resin being protected. Typical ultraviolet absorbers are 2-hydroxybenzophenones such as 2-hydroxy-4-n-octyloxybenzophenone and 2,4-dihydroxybenzophenone, and 2-(2'-hydroxyphenyl)benzotriazoles such as 2-(2'-hydroxy-5'-methylphenylbenzotriazole and 2-(2'-hydroxy-5'-t-butylphenyl) 5,6-di-chlorobenzotriazole.

(column 5 line 19 to column 10 line 23), 3,629,181 (column 5 line 15 to column 9 line 54), 3,673,152 (column 4 line 47 to column 8 line 62), 3,849,370 (column 5 line 5 to column 13 line 45). These disclosures are here incorporated by reference.

Illustrative of stabilizer compositions comprising coesters of polyhydric phenols with carbonic acid and an inorganic acid according to this invention together with known polymer stabilizers are the following:

| STABILIZER COMPOSITION | INGREDIENTS | PARTS BY WEIGHT |
|---|---|---|
| I | 2:1 (molar ratio) carbonate/borate of 4,4'-butylidenebis(3(methyl-6-t-butylphenol), approx. mol. wt. 1400 | 10 |
| | Zinc Stearate | 20 |
| | Magnesium benzoate | 15 |
| | Mannitol | 25 |
| II | 2:3 carbonate/phosphate of bis(3-methyl-4-hydroxy-5-t-butylbenzyl)sulfide, approx. mol. wt. 1900 | 12 |
| | Barium nonylphenolate | 30 |
| | Zinc 2-ethylhexoate | 18 |
| | Diphenyl isodecyl phosphite | 40 |
| III | 2:5 carbonate/p-cresylphosphate of 2,3,5-trimethyl-hydroquinone, approx. mol wt. 2900 | 25 |
| | 2-ethylhexyl epoxystearate | 45 |
| | tris(nonylphenyl) phosphite | 30 |
| IV | 4:3 carbonate/o-t-butylphenolphosphate of 4,4'-isopropyl-idenediphenol, approx. mol. wt. 2400 | 10 |
| | Strontium laurate | 80 |
| | Zinc laurate | 40 |
| | Dipentaerythritol | 15 |
| V | 1:1 carbonate/ phosphite of 2,2'-methylenebis(4,6-di-t-butylphenol), approx. mol. wt. 900 | 25 |
| | Distearyl thiodipropionate | 45 |
| | Trihexadecyl phosphite | 10 |
| VI | 2:1 carbonate/2-ethylhexyl phosphite of t-butylhydroquinone, approx. mol. wt. 4600 | 60 |
| | Dicyandiamide | 40 |
| VII | 3:1 carbonate/borate of 4,4'-thiobis(2-t-butyl-5-methylphenol), approx. mol. wt. 3300 | 15 |
| | Pentaerythritol bis(n-octadecyl phosphite) | 6 |
| VIII | 1:1 carbonate/acid phosphite of 1,1,3-tris(2'-methyl-4'-hydroxy-5'-t-butane, approx. mol. wt. 2200 | 15 |
| | Trimethylolpropane tris(3-isotridecylthiopropionate) | 55 |
| | 2(2'-hydroxy-5'-methylphenyl)benzotriazole | 15 |
| IX | 3:2-carbonate/phosphate of 4,4''-cyclohexylidenebis(2-t-butyl-phenol), approx. mol. wt. 5600 | 32 |
| | di-isotridecylthiodipropionate | 20 |
| | Calcium myristate | 28 |
| | N,N'-disalicyloylhydrazine | 20 |

For a further listing of many useful ultraviolet absorbers the disclosure of U.S. Pat. No. 3,395,112 of July 30, 1968, particularly column 14 line 40 to column 19 line 33, can be consulted. Stabilizer compositions according to this invention that protect synthetic resin compositions used in contact with materials containing heavy metals and their compounds, as in insulating materials for copper based electrical conductors or in compsitions pigmented with heavy metal containing pigments such as rouge, talc, and iron-bearing asbestos, can contain heavy metal deactivators that counteract the prodegradant effect of the heavy metal on synthetic resin compositions that would be satisfactorily stabilized in the absence of heavy metal. Heavy metal deactivators that can be used in stabilizer compositions according to this invention include melamine, dicyandiamide, oxanilide, N,N'-disalicyloylhydrazine, 3-salicyloylamido-1,2,4-triazole, as well as the heavy metal deactivators disclosed by M. Minagawa in U.S. Pat. Nos. 3,549,572

The preparation of the stabilized resin composition is easily accomplished by conventional procedures. A heated two roll mill, for example, is a convenient compounding tool for blending stabilizer compositions of the invention with polyolefins, vinyl chloride polymers, ABS polymers, ethylene-vinyl acetate copolymers and others.

The Examples that follow illustrate the invention without limiting its scope. Examples 1 through 24 describe the preparation of different polyhydric phenol inorganic acid and carbonic ester coesters of this invention by several of the techniques disclosed above. Examples 25 through 87 illustrate the use of coester stabilizers of this invention and stabilizer compositions comprising coesters of this invention in the stabilization of olefin polymers, a vinyl chloride polymer an ABS polymer, and a polyamide.

EXAMPLES 1-7

Triphenylphosphite (TPP) 31.0 g (0.1 mole), 4,4'-n-butylidenebis(3-methyl-6-t-butylphenol) 190.0 g (0.5 mole), 64.2 g (0.3 mole) diphenyl carbonate (DPC) and 0.3 g potassium carbonate were heated at 160° C. under the nitrogen atmosphere. Then vacuum was applied for 2 hours while distilling out phenol under reduced pressure (3 mm Hg). The quantity of phenol distillate was 65.2 g or 0.69 mole representing 76% of the maximum calculated (3 mm Hg) quantity.

A pale yellow solid of M.P. 110°-120° C., molecular weight 1880 was obtained (stabilizer No. 1). The molecular weight was measured by a vapor pressure method.

The following polyhydric phenol coester compounds in Table 1 were obtained by the same procedure as Example 1 by varying the polyhydric phenol and the molar proportions of the reactants.

Table 1

| STABILIZER NO. | POLYHYDRIC PHENOL (PHP) | MOLAR RATIO TPP:DPC:PHP | MELTING POINT° C. | APPROXIMATE MOLECULAR WEIGHT |
|---|---|---|---|---|
| 2 | Biphenol A | 2:2:5 | 75-80 | 1,290 |
| 3 | Hydroquinone | 2:2:5 | 120-152 | 850 |
| 4 | 4,4'Thiobis(3-methyl-6-t--butyl)phenol | 1:4:6 | 125-136 | 2,100 |
| 5 | 4,4'-cyclohexylidene bis(2--cyclohexylphenol) | 1:2:4 | 80-100 | 1,700 |
| 6 | 4,4'-isopropylidene bis(2-t-butylphenol) | 3:1:5 | 67-75 | 1,900 |
| 7 | 1,1,3-tris(2'-methyl-5'-t-butyl-4'-hydroxyphenol)butane | 2:1:4 | 81-93 | 2,200 |

EXAMPLES 8-15

Diphenyl 2-ethylhexylphosphite (DEP) 69.2 g (0.2 mole), diphenylcarbonate (DPC) 64.2 g (0.3 mole) and 136.8 g (0.6 mole) bisphenol A and potassium carbonate 0.26 g were reacted at 140° C. for 3 hours under nitrogen and then 24 hours more under reduced pressure (3 mm Hg) while distilling out 85.1 g phenol (0.91 mole) or 75% of the maximal calculated quantity.

A colorless glassy solid of 54°-58° C., m.w. 1600 was obtained. (stabilizer No. 8).

In the same way as EXAMPLE 8, the compounds obtained by varying the polyhydric phenol and the molar proportions of reactants are shown in Table 2.

TABLE 2

| EXAMPLE NO. | POLYVALENT PHENOL (PVP) | MOLAR RATIO DEP:DPC:PVP | MELTING POINT (° C) | M.W. |
|---|---|---|---|---|
| 9 | 4,4'-n-butylidene bis (2-t-butyl-5-methyl phenol) | 1:1:3 | 45-62 | 1535 |
| 10 | 4,4'-cyclohexylidene diphenol:2,2-bis(3-t-butyl-4-hydroxyphenyl)-4-(3,5-di-t-butyl-4-hydroxy phenol) butane (2:2 mixture) | 2:1:4 | — | 1272 |
| 11 | 2,2-bis(3-t-butyl-4-hydroxyphenol) butane | 2:1:2 | — | 1486 |
| 12 | 4,4'-thiobis(2-t-butyl-6-methyl phenol) | 4:1:6 | — | 3425 |
| 13 | 4,4'-methylene bis(2-t-butyl-6-methyl phenol) | 3:2:4 | — | 1697 |
| 14 | Bis phenol A:4,4'-n-butylidene bis(2-t-butyl-5-methylphenol) (2:2 mixture) | 1:2:4 | 50-63 | 1287 |
| 15 | Bis phenol A | 2:5:8 | 80-88 | 2043 |

EXAMPLES 16-19

65.2 g (0.2 mole) of triphenylphosphate (TPPa),
42.8 g (0.2 mole) of diphenylcarbonate (DPC),
191.0 g (0.5 mole) of 4,4'-n-butylidenebis(2-t-butyl-5-methyl phenol) and
0.4 g of potassium carbonate were reacted for 3 hours at 165° C. under a nitrogen stream, and then 56.4 g (0.6 mole) of produced phenol was distilled out during 3 hours in vacuum (3 mmHg).

A pale yellow glassy solid was obtained (EXAMPLE No. 16) having a m.p. 85°-97° C. and M.W. 1723.

The compounds of EXAMPLES No. 17-19 were prepared according to the same procedure as EXAMPLE 16 and described in TABLE-3.

TABLE-3

| EXAMPLE No. | POLYVALENT PHENOL (PVP) | MOLAR RATIO TPPa: DPC:PVP | M.P. (° C) | M.W. |
|---|---|---|---|---|
| 17 | 4,4'-isopropylidene bis (2-t-butyl phenol) | 1:3:5 | 97-115 | 989 |
| 18 | 4,4'-thiobis(3-methyl-6-t-butylphenol) | 2:1:2 | 81-93 | 814 |
| 19 | 1,1,3-tris(2-methyl-4-hydroxy-5-t-butylphenyl) butane | 1:2:3 | 112-117 | 1457 |

EXAMPLES 20-23

58.0 g (0.2 mole) of triphenyl borate (TPB), 42.8 g (0.2 mole) of diphenyl carbonate (DPC), 191.0 g (0.5 mole) of 4,4'-butylidene bis(2-t-butyl-5-methyl phenol) and 0.2 g of potassium carbonate were reacted for 3 hours at 150° C. under a nitrogen stream and then 71.4 g (0.76 mole) of produced phenol was distilled out during 3 hours in vacuum (3 mm Hg).

The compounds of EXAMPLES No. 21-23 were prepared according to the same procedure as EXAMPLE 20 and described in TABLE-4.

TABLE 4

| EXAMPLE NO. | POLYVALENT PHENOL (PVP) | MOLAR RATIO TPB:DPC:PVP | MELTING POINT (° C) | M.W. |
|---|---|---|---|---|
| 21 | Bisphenol A | 2:1:5 | 62–67 | 1147 |
| 22 | 2,2-bis(3-t-butyl-4-hydroxy phenol)-4-3, 5-di-t-butyl-4-hydroxy phenyl)butane | 1:2:4 | 84–90 | 2154 |
| 23 | 4,4'-cyclohexylidene bis(2-cyclohexylphenol) | 2:2:3 | 56–69 | 1396 |

EXAMPLE - 24

46.8 g (0.2 mole) of diphenyl hydrogen phosphite, 42.8 g (0.2 mole) of diphenyl carbonate, 114.0 g (0.5 mole) of bisphenol A and 0.2 g of potassium carbonate were reacted for 3 hours at 160° C. under nitrogen stream, and then 70.4 g (0.75 mole) of produced phenol was distilled out during 2 hours in vacuum (3 mmHg).

A pale yellow solid was obtained having m.p. 80°–90° C.

The compounds mentioned above were tested for polypropylene, polyethylene, polybutene-1, ABS, PVC, polyamide and ethylene-vinyl acetate copolymer as antioxidant, as described in the following examples.

EXAMPLES 25-32

Substantially unstabilized polypropylene resin (Profax 6501, containing a trace of BHT antioxidant to protect the polymer during shipment and storage only) 100 parts by weight, dilaurylthiodipropionate 0.2 parts by weight, and polyhydric phenol inorganic acid carbonate coester 0.2 part by weight were mixed for ten minutes by mixing and grinding at room temperature and milled and molded to make a sheet of 1.0 mm in thickness at 180° C. and 200 kg/cm² for 5 minutes. From this sheet were cut ten sample pieces of 10×20 mm of each formulation, and exposed on aluminum foil in a Geer air-circulating oven at 160° C. for heat stability examination. Ten additional sample pieces of the same size cut from each sheet were kept for 7 days in water at 90° C. and then oven tested at 160° C. to test the resistance of the stabilizer against being leached or otherwise rendered ineffective. The time to the beginning of degradation was taken as the time when more then five sample pieces in ten of each formuation were discolored and brittle.

The stabilizer ingredients used and the results obtained are shown in TABLE-5.

TABLE 5

| No. Control | Stabilizer | Deterioration Beginning Time | Steeped in hot water (7 days) |
|---|---|---|---|
| A | 4,4'-n-butylidenebis(3-methyl-6-t-butylphenol | 490 hours | 250 hours |
| B | NONE | 110 | 90 |
| Example | Polyhydric phenol coester | | |
| 25 | No. 1 | 1,300 | 1,180 |
| 26 | No. 4 | 1,240 | 1,140 |
| 27 | No. 5 | 1,270 | 1,200 |
| 28 | No. 11 | 1,290 | 1,170 |
| 29 | No. 14 | 1,150 | 1,080 |
| 30 | No. 17 | 1,070 | 1,040 |
| 31 | No. 20 | 1,270 | 1,150 |
| 32 | No. 24 | 1,100 | 1,060 |

Each of the polypropylene samples of Examples 30 through 37 stabilized according to this invention with a coester of carbonic acid and an inorganic acid with a polyhydric phenol had when freshly prepared at least double the heat stability of a control composition containing a conventional phenolic stabilizer along with the same dilauryl thiodipropionate synergist, used in EXAMPLES 25–32. After the 7 day immersion test in hot water the difference was even more dramatic. The samples of Examples 25 through 32 stabilized according to this invention had substantially retained their heat stability while the control composition had retained only about one half the original heat stability.

EXAMPLES 33-40

Stabilized polyethylene resin (Hi-Zex 5100E, Mitsui Petrochemical Industries, Ltd. Japan) 100 parts by weight and a polyhydric phenol inorganic acid-carbonate coester 0.15 part by weight were milled on a two roll mill for 5 minutes at 150° C. and then molded into a sheet of 1.2 mm thickness by compression molding at 150° C. and 180 kg/cm² for 5 minutes. The sheet was cut into sample pieces of 10 + 20 mm and tested for heat stability in the Geer oven at 148.5° C. in air on aluminum foil. The time to the beginning of degradation was taken as the time when more than five sample pieces in ten of each formulation were discolored and waxy. The stabilizer ingredients used and the results obtained are shown in Table.

TABLE 6

| No. Control | STABILIZER | Deterioration Beginning Time |
|---|---|---|
| C | 1,1,3-tris(2'methyl-4'-hydroxy-5'-t-butylphenyl)butane | 305 hours |
| D | Stearyl 3(3',5'-di-t-butyl-4'--hydroxyphenyl)propionate | 346 |
| E | None | 193 |
| Example | Polyhydric phenol coester | |
| 33 | No. 6 | 427 |
| 34 | No. 7 | 442 |
| 35 | No. 9 | 455 |
| 36 | No. 13 | 446 |
| 37 | No. 16 | 412 |
| 38 | No. 18 | 403 |
| 39 | No. 22 | 450 |
| 40 | No. 23 | 448 |

Each of the polyethylene samples of Examples 38 through 45 stabilized according to this invention with a coester of carbonic acid and an inorganic acid with a polyhydric phenol had a 16 to 48% greater heat stability than a control sample stabilized instead with a known phenolic antioxidant.

EXAMPLES 41-47

ABS resin (Blendex 111) 100 parts by weight, Zinc stearate 0.5 part by weight, titanium dioxide 5.0 parts by weight, and a polyhydric phenol inorganic acid-carbonate coester 0.5 part by weight were mixed by grinding at room temperature for 10 minutes.

The compound was prepared by extruding the ground mixture using a 30 mm extruder at 30 rpm and 240° C. A sheet of 0.5 mm thickness was prepared by compression molding each extruded compound at 200 kg/cm² and 180° C. for 5 minutes. Each molded sheet was cut to the size of 40 × 150 mm, and suspended in an individual glass cyclinder.

Each cylinder was set in an air circulating oven at 140° C., flushed with pure oxygen, the pressure adjusted to one atmosphere, and the cylinder fitted with a closed end manometer. The time to beginning of oxidation-degradation was read by recording the time when the pressure in the cylinder diminished rapidly. The ingredients of the stabilizer combination used in each example and the results observed are shown in Table 7.

TABLE 7

| No. Control | STABILIZER | DETERIORATION BEGINNING TIME |
|---|---|---|
| F | None | 160 minutes |
| G | 4,4'-thiobis(3-methyl-6-t-butylphenol) | 240 |
| Example | Polyhydric Phenol Coester | |
| 41 | No. 2 | 580 |
| 42 | No. 5 | 530 |
| 43 | No. 8 | 590 |
| 44 | No. 10 | 570 |
| 45 | No. 15 | 580 |
| 46 | No. 16 | 510 |
| 47 | No. 17 | 540 |

Each of the ABS polymer samples of Examples 41 through 47 stabilized according to this invention with a coester of carbonic acid and an inorganic acid with a polyhydric phenol had at least double the heat stability of a control sample stabilized with the same zinc stearate as in Examples 41 through 47 along with a conventional polyhydric phenol stabilizer.

EXAMPLES 48–55

A clear sheet was prepared by kneading polyvinylchloride resin (Geon 103EP) 100 parts, dioctylphthalate 42 parts, epoxidized soybean oil 3 parts, zinc stearate 0.3 part, barium stearate 0.5 part, stearic acid 0.3 part, and a polyhydric phenol inorganic acid-carbonate coester 0.3 part on a two roll mill at 175° C. for 5 minutes and then compression molding at 175° C. Then, a heat stability test was carried out in a Geer oven at 190° C. in an air atmosphere. The time to degradation time was determined by the discoloration observed. The polyhydric phenol coester used and the results obtained are shown in Table 8.

TABLE 8

| No. Control | STABILIZER | Beginning Time OF DETERIORATION Yellowed | Blackened |
|---|---|---|---|
| H | None | 30 min. | 40 min. |
| I | BHT | 35 | 45 |
| Example | Polyhydric phenol coester | | |
| 48 | No. 3 | 65 | 80 |
| 49 | No. 6 | 60 | 75 |
| 50 | No. 9 | 60 | 75 |
| 51 | No. 10 | 65 | 80 |
| 52 | No. 15 | 70 | 85 |
| 53 | No. 17 | 50 | 65 |
| 54 | No. 23 | 60 | 80 |
| 55 | No. 24 | 65 | 85 |

Each of the polyvinyl chloride samples of Examples 28 through 55 stabilized according to this invention with a coester of carbonic acid and an inorganic acid with a polyhydric phenol, along with epoxidized soybean oil, zinc stearate, and barium stearate, had at least 43% greater heat stability than a control sample containing a conventional hindered phenol along with the same epoxidized soybean oil, zinc stearate, and barium stearate.

EXAMPLES 56–63

100 parts of nylon 66 delustered by adding 0.05% of titanium dioxide was dissolved in 90 parts of 90% formic acid, and 1.0 part of a polyhydric phenol inorganic acid-carbonate coester was added and mixed completely. The solution was flowed uniformly on a glass plate, and dried in a heated air oven at 105° C. for 10 minutes to prepare a film. The color of the film, after being heated in an air oven at 225° C. for 30 minutes was measured and shown in Table 9 along with the compounds present in each formulation.

Table - 9

| No. | Stabilizer | Color of Sheet |
|---|---|---|
| Control | | |
| J | None | dark brown |
| K | 4,4'-cyclohexylidene Bisphenol | brown |
| Example | Polyhydoic phenol | |
| 56 | No. 2 | light yellow |
| 57 | No. 4 | " |
| 58 | No. 8 | " |
| 59 | No. 11 | " |
| 60 | No. 12 | " |
| 61 | No. 19 | Yellow |
| 62 | No. 20 | light yellow |
| 63 | No. 23 | light yellow |

Each of the nylon samples of Example 56 through 63 stabilized according to this invention with a coester of carbonic acid and an inorganic acid with a polyhydric phenol gave a much lighter colored film than control samples containing instead of the coester according to this invention a conventional polyhydric phenol stabilizer or no stabilizer.

EXAMPLES 64 to 77

In order to examine the effect of the stabilizer according to this invention on polybutene resin, a sheet of 1 mm in thickness was prepared by kneading the following formulation on a two roll mill and then compression molding at 160° C. and 200 kg/cm$^2$ for 5 minutes. The sheet obtained was cut to the size of 40 × 150 mm, and tested for heat stability in glass cylinders containing pure oxygen at 1 atmosphere pressure as in Example 41 to 47, except that the test temperature was 160° C.

| (Formulation) | |
|---|---|
| Un-stabilized poly-1-butene resin | 100 parts by weight |
| Calcium stearate | 1.0 |
| Distearylthiodipropionate | 0.2 |
| Polyhydric phenol inorganic acid-carbonate coester | 0.2 |

The results are shown in Table 10. The time to beginning of oxidation degradation was read by recording the time when the pressure in the cylinder diminished rapidly.

Table - 10

| No. | Stabilizer | Deterioration Beginning Time |
|---|---|---|
| Control | | |
| L | BHT | 97 hrs |
| M | 4,4-butylidenebis (3-methyl-6-t-butylphenol) | 224 |
| Example | Polyhydric phenol coester | |
| 64 | No. 1 | 570 |
| 65 | No. 3 | 523 |
| 66 | No. 7 | 546 |
| 67 | No. 12 | 561 |
| 68 | No. 14 | 545 |
| 69 | No. 19 | 506 |

Table - 10-continued

| No. | Stabilizer | Deterioration Beginning Time |
|---|---|---|
| 70 | No. 20 | 568 |
| 71 | No. 21 | 517 |

Each of the polybutene samples of EXAMPLES 64 through 71 stabilized according to this invention with a coester of carbonic acid and an inorganic acid with a polyhydric phenol had at least double the heat stability of a control sample stabilizer with the same distearylthiodipropionate and calcium stearate as in Example 64 through 71 along with a conventional polyhydric phenol stabilizer.

EXAMPLES 72–79

In order to examine the effects of the coesters according to this invention in ethylene-vinylacetate copolymer, samples were prepared according to the following formulation and tested for heat stability in a Geer oven at 175° C. and initial color was measured for yellowness using the Hunter color difference meter, greater numbers indicating more severe discoloration.

The results are shown in Table 11. The heat stability is expressed in minutes of heating in the oven until a red or brown discoloration was observed. (Formulation)

| | |
|---|---|
| Ethylene-Vinylacetate copolymer resin | 100 parts |
| Montan wax ester lubricant | 0.3 |
| Polyhydric phenol inorganic acid-carbonate ester | 0.1 |

Table - 11

| No. | Sample Compound | Heat Stability | Initial Color |
|---|---|---|---|
| Control | Stabilizer | | |
| N | None | 75 min | 35 |
| O | 4,4-butylidenebis (3-methyl-6-t-butyl-phenol) | 90 | 28 |
| Example | polyhydric phenol coester | | |
| 72 | No. 1 | 150 | 9 |
| 73 | No. 5 | 150 | 10 |
| 74 | No. 7 | 135 | 12 |
| 75 | No. 9 | 150 | 10 |
| 76 | No. 13 | 135 | 11 |
| 77 | No. 18 | 120 | 10 |
| 78 | No. 22 | 135 | 11 |
| 79 | No. 24 | 120 | 9 |

Each of the ethylene-vinylacetate copolymer samples of Example 78 through 85 stabilized according to this invention with a coester of carbonic acid and an inorganic acid with a polyhydric phenol had much lighter initial color and at least 33% greater heat stability than a control sample stabilized with a conventional polyhydric phenol.

EXAMPLES 80–87

The stabilizer combinations according to this invention have an excellent stabilizing effect on crosslinked polyethylene. Unstabilized low density polyethylene(-melt index 2.0) 100 parts by weight, dilaurylthiodipropionate 0.2 part by weight, and a polyhydric phenol inorganic acid and carbonate coester 0.2 part by weight were mixed by milling on a two roll mill at 110° C. for 10 minutes and then dicumyl peroxide (Percumyl D, Nippon Oil and fats Co., Ltd) 2.0 parts by weight was added and further kneaded at the same temperature for two minutes. This sheet prepared on the mill was compression molded at 110° C. and 100 kg/cm² for 5 minutes, then rapidly heated up to 180° C. while maintaining the pressure at 100 kg/cm² for 15 minutes. The sheet obtained was cut to the size of 40 × 150 mm, hung in a Geer oven and tested for heat stability in air at 160° C. The degradation time was judged by looking for the time when more than 50% of pieces were discolored or deformed. The stabilizer ingredients used and the results obtained are shown in Table 12.

Table - 12

| No. | Sample Compound | Beginning Time of Aging |
|---|---|---|
| Control | Stabilizer | |
| P | BHT | 34 hrs. |
| Q | 4'4-thiobis(3-methyl-6-2) butylphenol) | 110 |
| Example | Polyhydric phenol coester | |
| 80 | No. 1 | 176 |
| 81 | No. 4 | 184 |
| 82 | No. 7 | 166 |
| 83 | No. 9 | 172 |
| 84 | No. 14 | 163 |
| 85 | No. 18 | 179 |
| 86 | No. 20 | 165 |
| 87 | No. 23 | 160 |

Each of the cross-linked polyethylene samples of Example 86 through 93 stabilized according to this invention with a coester of carbonic acid and an inorganic acid with a polyhydric phenol had at least 46% greater heat stability than a control sample stabilized with a conventional polyhydric phenol.

We claim:

1. As a new composition of matter, a coester having a molecular weight between 700 and about 10,000, of at least one polyhydric phenol having 2 to 3 phenolic hydroxyl groups and 1 to 3 benzenoid rings, with carbonic acid and boric acid, in which the molar proportions of carbonic acid to boric acid range from 19:1 to 1:19.

2. A coester according to claim 1 having a molecular weight between 1200 and about 7000.

3. A coester according to claim 1 in which the polyhydric phenol is 2,5-di-t-butylhydroquinone.

4. A coester according to claim 1 in which the polyhydric phenol has 3 benzenoid rings in the molecule.

5. A coester according to claim 1 in which the polyhydric phenol is an alkylidenebisphenol.

6. A coester according to claim 1 in which the polyhydric phenol is a bis-phenol with two benzenoid rings linked through sulfur.

7. A stabilizer composition capable of increasing the resistance to deterioration on heating of a synthetic resin, comprising a coester according to claim 1 and at least one synthetic resin stabilizer selected from the group consisting of thiodipropionate esters, 1,2-epoxides, organic phosphites, polyhydric alcohols, polyhydric alcohol 3-alkylthiopropionates, ultraviolet absorbers, heavy metal deactivators, and barium, calcium, magnesium, nickel, strontium, tin, and zinc salts of monocarboxylic acids having 6 to 24 carbon atoms.

8. A stabilizer composition according to claim 7 in which the synthetic resin stabilizer is a thiodipropionate ester.

9. A stabilizer composition according to claim 7 in which the synthetic resin stabilizer is a 1,2-epoxide.

10. A stabilized synthetic resin composition comprising a synthetic resin and 0.01 to 5 percent by weight of the resin of a coester according to claim 1.

11. A stabilized synthetic resin composition according to claim 10 in which the synthetic resin is selected from the group consisting of olefin polymers, vinyl chloride polymers, acrylonitrile copolymers and polyamides.

12. A stabilized synthetic resin composition according to claim 10 comprising polyvinyl chloride, epoxidized soybean oil, and zinc stearate.

13. A stabilized synthetic resin composition according to claim 10 comprising acrylonitrile-butadiene-styrene polymer and zinc stearate.

14. A stabilized synthetic resin composition according to claim 10 comprising polybutene, calcium stearate, and dilauryl thiodipropionate.

* * * * *